United States Patent [19]

Nylander

[11] 4,201,826

[45] May 6, 1980

[54] POLYMERIZABLE UNSATURATED POLYESTER COMPOSITIONS USEFUL IN THE MANUFACTURE OF MULTILAYER LAMINATES AND LAMINATES PREPARED THEREFROM

[75] Inventor: Perry Nylander, Gothenburg, Sweden

[73] Assignee: AB Syntes, Nol, Sweden

[21] Appl. No.: 51

[22] Filed: Jan. 2, 1979

[30] Foreign Application Priority Data

Jan. 5, 1978 [SE] Sweden ............................... 7800148

[51] Int. Cl.$^2$ ..................... C08L 91/06; C08L 67/06; C08L 67/08; B32B 17/04
[52] U.S. Cl. ............................ 428/268; 260/22 CB; 260/28 R; 428/430; 428/483; 428/484; 428/523; 525/166; 525/170; 525/171
[58] Field of Search ............... 260/28 R, 22 CB, 861, 260/220 B; 428/480, 482–484, 523, 430, 431, 268; 525/166, 170, 171

[56] References Cited

U.S. PATENT DOCUMENTS

| | | | |
|---|---|---|---|
| 2,482,070 | 9/1949 | Schoenholz et al. | 260/28 X |
| 2,639,270 | 5/1953 | Griess et al. | 260/22 CB |
| 2,639,271 | 5/1953 | Griess et al. | 260/22 CB |
| 3,018,267 | 1/1962 | Steckler et al. | 428/431 |
| 3,619,267 | 11/1971 | Weissermel et al. | 260/28 |
| 3,619,392 | 11/1971 | Metzner et al. | 260/28 X |
| 3,657,389 | 4/1972 | Caldwell et al. | 428/430 X |
| 4,103,061 | 7/1978 | Chomes | 428/430 X |

*Primary Examiner*—Harold Ansher

[57] ABSTRACT

Polymerizable unsaturated polyester compositions are provided, particularly useful in the manufacture of multilayer laminates, consisting essentially of (1) a polyester of a polyhydric alcohol and a polycarboxylic acid, at least one of which is ethylenically unsaturated;

(2) a monomer copolymerizable with the unsaturated polyester and having a boiling point below 150° C.;

(3) an additive forming a film on the polyester surface that inhibits volatilization of monomer from the polyester composition; and (4) a hydrophobic compound soluble at least in part both in the unsaturated polyester and in the film-forming additive that either (a) has an isoprene unit structure, or (b) is acyclic and has at least one ester and/or ether bond; and at least two terminal hydrocarbon groups, each with at least one ethylenically unsaturated group.

17 Claims, No Drawings

POLYMERIZABLE UNSATURATED POLYESTER COMPOSITIONS USEFUL IN THE MANUFACTURE OF MULTILAYER LAMINATES AND LAMINATES PREPARED THEREFROM

Polymerizable unsaturated polyester compositions have been extensively used in the manufacture of reinforced multilayer laminates. Such polymerizable unsaturated polyesters are derived from one or more polyhydric alcohols and one or more polycarboxylic acids, at least one of the alcohols or the carboxylic acids having at least one ethylenically unsaturated group. Polyesters derived from alpha, beta-unsaturated dicarboxylic acids are the most widely used. In addition, the resin composition may include a monomer copolymerizable with the polyester, such as a vinyl compound, for example, styrene, having a boiling point below 150° C. In the presence of a suitable catalyst or polymerization initiator system such as cobalt naphthenate and a peroxide, the monomer can be copolymerized with the polyester, optionally in the presence of a reinforcing material, to form cured resins of high mechanical strength and low density. The polyester can, if desired, be modified by incorporation of small amounts of saturated or unsaturated monocarboxylic acids and/or monohydric alcohols.

In many instances, the monomer copolymerizable with the polyester has a relatively low boiling point, with a consequent high vapor pressure at atmospheric temperature, and at the curing temperature. The result is that the monomer may be volatilized in the course of the curing or polymerization reactions, and can reach toxic levels in the surrounding atmosphere.

Accordingly, in order to inhibit volatilization of monomer, such compositions may include a film-forming additive of low volatility, that is, forms a protective film on the surface of the composition which inhibits volatilization of the monomer. Small amounts of such additives are usually sufficient, within the range from about 0.01 to about 2% by weight, and preferably from about 0.05 to about 0.5% by weight, of the polyester resin composition.

However, the surface films of such volatilization inhibitors also interfere with the formation of a good bond between adjacent surface layers of the polyester composition in, for example, multilayer laminates. Volatilization inhibitors such as paraffin, stearic acid and stearic acid esters are in fact good lubricants. Their surface films reduce adhesion and increase slip. There has had to be a trade-off, therefore, between inhibiting volatilization of monomer and reducing adhesion between layers, with unsatisfactory consequences either way.

In accordance with the invention, such unsaturated polymerizable polyester resin compositions are rendered more adherent in multilayer laminates, despite the presence of the volatilization-reducing additive, by incorporation in the composition of a hydrophobic organic compound that is soluble at least in part in both the unsaturated polyester resin composition and in the volatilization-reducing additive, that is selected from the group consisting of two classes of compounds:

(1) compounds having an isoprene unit structure, such as the terpenes, for example, dipentene, alpha-pinene and beta-pinene, the monoterpenes being preferred, and (2) acyclic compounds having at least one ester and/or ether group as the only hydrophilic group and at least two terminal hydrocarbon groups, each having at least one ethylenically unsaturated double bond.

Such polyester resin compositions contain:

(1) for each 60 parts by weight of polymerizable unsaturated polyester of at least one polycarboxylic acid and at least one polyhydric alcohol, of which at least one of the alcohol and acid includes a polymerizable ethylenically unsaturated double bond;

(2) an amount within the range from about 15 to about 80 parts by weight, preferably from about 30 to about 60 parts by weight, of a monomer copolymerizable with the unsaturated polyester and having a boiling point below 150° C.;

(3) an amount within the range from about 0.01 to about 2 parts by weight, preferably from about 0.05 to about 0.5 parts by weight, of an additive reducing volatilization of the monomer; and (4) an amount within the range from about 0.01 to about 5 parts by weight, preferably from about 0.1 to about 2 parts by weight, of a hydrophobic organic compound that is soluble at least to some extent both in the unsaturated polyester and in the volatilization-reducing additive.

The polymerizable unsaturated polyester resin compositions in accordance with the invention are particularly useful in the formation of multilayer laminates from polyester layers that are polymerized or cured to a Barcol value higher than about 40 before application of the next-adjacent layer in the laminate. Usually, from about 6 to about 24 hours of curing at room temperature is required for the polyester layer to reach this hardness level. Under such conditions, in the absence of the hydrophobic organic compound, a poor adhesion is obtained between adjacent layers, especially when the layer that is cured first is not reinforced, or if reinforced has an excess of polyester resin.

The polymerizable unsaturated polyester resin compositions in accordance with the invention can be used in the manufacture of a wide range of conventional molded or cured products which contain polyester resin, and in which good adhesion between adjacent layers of multilayer laminates is desirable or required. Examples of such products are the hulls of boats, transparent layers, fireproof molded articles, tanks and pipes, chemically-resistant molded materials, heat-resistant molded materials, polyester concrete, polyester putty, polyester glue, polyester coating compositions such as gel coat and top coat, which can be manufactured in the conventional way, including manual application of the several layers, spraying, injection molding, hot pressing, cold pressing, and similar techniques.

Not all ethers and esters can be employed as the hydrophobic compound in accordance with the invention. Compounds containing a dominating hydrophilic part, for instance, a multiplicity of ether groups, such as the polyoxyethylene alcohols and ethers and esters thereof, as well as a multiplicity of hydrophilic groups, as is characteristic of the sugars, are unsuitable. Compounds that are so hydrophilic that they are capable of forming micelles and having an emulsifying effect and thereby incorporate water in the unsaturated polyester resin composition are not operative.

The preferred ether and/or ester compounds contain one ether or ester group for each two or three acyclic hydrocarbon groups having from about two to about thirty carbon atoms, and preferably from about two to twenty-four carbon atoms. At least two of the acyclic hydrocarbon groups have at least one and may have several ethylenically unsaturated groups.

Such compounds are defined by the formula $$R_2(XR_1)_m$$

wherein:
(1) each X is an oxyether —O— or carboxylic ester $$-\underset{\underset{O}{\|}}{C}-O- \quad \text{or} \quad -O-\underset{\underset{O}{\|}}{C}-$$

group;
(2) $R_1$ is an acyclic hydrocarbon group having from two to thirty, preferably from two to twenty-four, and still more preferably from four to twenty-four, carbon atoms, and at least two of them having at least one ethylenically unsaturated group;
(3) $R_2$ is an acyclic hydrocarbon group which may optionally include a hydroxy group having from about two to about twelve, preferably from about three to about six, carbon atoms; $R_2$ is preferably a polyvalent hydrocarbon residue; and
(4) m is a number from 2 to 8, and preferably from 2 to 4.

The compounds within the above class in which X is a carboxylic ester group $$-\underset{\underset{O}{\|}}{C}-O- \quad \text{or} \quad -O-\underset{\underset{O}{\|}}{C}-$$

are preferably derived from the drying unsaturated aliphatic fatty acids, and are esters of polyhydric alcohols and such acids in which substantially all hydroxyl groups of the polyhydric alcohols are esterified. Exemplary polyhydric alcohols include ethylene glycol, propylene glycol, glycerol, pentaerythritol and trimethylolpropane. Exemplary unsaturated drying fatty acids include oleic acid, ricinoleic acid, linoleic acid, linolenic acid, eleostearic acid, licanic acid, arachidonic acid, and erucic acid. Also useful are the mixtures of carboxylic acids and carboxylic acid glycerides derived from naturally-occurring drying fatty oils, including tung oil fatty acids, soybean oil fatty acids, oiticica oil fatty acids, safflower oil fatty acids, and cottonseed oil fatty acids. Particularly preferred are the fatty acids having at least two ethylenically unsaturated double bonds, such as ricinoleic, linoleic and linolenic acids.

Particularly preferred are the substantially completely esterified esters of polyunsaturated fatty acids having at least two ethylenically unsaturated double bonds with from about sixteen to about twenty-four carbon atoms with polyhydric alcohols having three or four hydroxyl groups, such as glycerol, pentaerythritol and trimethylolpropane. Such esters improve adhesion between the adjacent layers of multilayer laminates. An exemplary preferred material is crude, bodied or cooked linseed oil, which is readily available at low cost, and is of satisfactory solubility in the unsaturated polymerizable polyester resin composition.

The ethylenically unsaturated group of the unsaturated polymerizable polyester is normally derived from an alpha, beta-unsaturated dicarboxylic acid, such as maleic acid, fumaric acid, itaconic acid, aconitic acid, mesaconic acid, and citraconic acid, as well as their anhydrides and mixtures thereof. Other dicarboxylic acids that can be used include orthophthalic acid and its anhydride, isophthalic acid, terephthalic acid, and adipinic acid, particularly in admixture with one or more of the unsaturated dicarboxylic acids referred to above.

The polyhydric alcohol of the polyester is normally a saturated polyhydric alcohol, such as ethylene glycol, propylene glycol-1,2 and -1,3, butylene glycol-1,4 -2,3 and -1,3, diethylene glycol, dipropylene glycol, and dibutylene glycol. Propylene glycol and its mixtures with any of the other polyhydric alcohols referred to are preferred.

As the copolymerizable monomer, any of the monomers known to be copolymerizable with polyesters can be used. Usually the monomer is styrene, but also useful are vinyl and allyl compounds such as methyl methacrylate, acrylonitrile, vinyl chloride, allyl chloride, and vinyl acetate.

Any of the known film-forming polyester-insoluble or -sparsely soluble compounds inhibiting volatilization of the monomer from the polyester resin composition, particularly during curing, can be employed. Such agents, as is known, form surface films on the polyester resin, due to their limited solubility or insolubility in the resin, and this film inhibits volatilization of the monomer since it is only penetrated by the monomer with difficulty. Among the known materials that can be employed are the paraffin waxes and other solid paraffin hydrocarbons and similar compounds derived from petroleum, fatty acid esters and salts such as stearic acid, stearic acid esters and calcium stearate, as well as plastic materials of low melting point, including copolymers of vinyl chloride and vinyl acetate, silicone gums, alkyd resins, polyethylene and polypropylene.

In addition to these ingredients, which are the essential ingredients, the polymerizable unsaturated polyester resin compositions in accordance with the invention also can include conventional additives such as pigments, dyes, coloring agents, bactericides, fungicides, ultraviolet light-absorbing additives, heat-stabilizers, viscosity improvers and liquefiers, fillers, and thixotropic modifiers.

Preferred embodiments of the polymerizable unsaturated polyester resin compositions in accordance with the invention are shown in the Examples which follow.

EXAMPLES 1 to 6

A series of multilayer laminates was prepared from a polymerizable unsaturated polyester derived from a mixture of phthalic acid and maleic acid in a molar ratio of 4:3 and propylene glycol. To the unsaturated polyester resin there was added about 40% by weight of styrene and about 1% by weight of pyrogenic silica, these amounts being by weight of the entire resin composition. The mixture had an acid value of about 23, and a viscosity of from 1.2 to 2 poise at 5000 reciprocal seconds, measured at 25° C.

This unsaturated polyester resin composition was blended with 0.1% by weight of paraffin, to inhibit the volatilization of styrene, with 0.1% by weight of 12% cobalt naphthenate and 1.5% by weight of methyl ethyl ketone peroxide as the catalyst initiator system, and with 0.3% by weight of the hydrophobic organic compound shown in Table I below for improving adhesion of adjacent laminate layers.

In each case, a glass fiber mat weighing 450 g per square meter and normally used in the manufacture of polyester multilayer laminate was impregnated with this composition, giving a laminate layer having a glass fiber content of from about 25 to about 28% by weight. This layer was allowed to harden to a Barcol value of about 40. Then, a 1 to 2 mm thick layer of a polyester composition without glass fiber mat was applied to the laminate, and this second layer was also allowed to harden. A new laminate was then laid down on the fiber-free polyester layer, composed of three layers of glass fiber mat weighing 450 g per square meter, and these were well impregnated with the same polyester composition to a glass fiber content of 28% by weight, after which the new layer was allowed to harden to a Barcol value of 45.

The completed four-layer laminate whose thickness was about 5 mm was then sawed into sample pieces, each 3×25 cm in surface area.

As a Control, a laminated molded product was prepared exactly as described above, but without the hydrophobic organic compound noted in Table I.

The relative degree of adhesion between the polyester layer without glass fiber and the layer having three resin-impregnated glass fiber mats was tested by seeking to pry the layers apart with a wood chisel, applying the chisel to the boundary layer between the layers. If the adhesion between the layer without glass fibers and the layer with glass fibers was greater than that of the layer containing glass fibers per se, the break would be not between the layers but in the surface glass fiber layer, in which event of course the break would contain glass fibers. The more glass fibers in the break, the more the break was confined to the glass fiber-containing layer and away from the interface between the layers, and the better the adhesion between the two layers, therefore.

Accordingly, the number of glass fibers in the break surface was judged visually according to a scale of three grades, in which 1 represents a break surface totally free or substantially free from glass fibers, and 3 a break surface with the greatest number of glass fibers, with the value of 2 half way between. Six samples were pried apart and the average taken for reproduction in Table I.

TABLE I

| Example No. | Hydrophobic compound | Average value of six tests |
|---|---|---|
| 1 | Crude linseed oil | 3.0 |
| 2 | Bodied linseed oil | 3.0 |
| 3 | Glyceryl trioleate | 2.6 |
| 4 | Triethylene glycol dimethacrylate | 1.8 |
| 5 | Trimethylolpropane diallyl ether | 2.0 |
| 6 | Dipentene | 2.2 |
| Control | | 1.0 |

It is apparent that the addition of the hydrophobic organic compound in accordance with the invention considerably improved adhesion between the non-glass fiber-containing layer and the glass fiber-containing layer. Particularly good results are obtained using linseed oil, both crude and bodied, and glyceryl trioleate.

EXAMPLES 7 and 8

A series of multilayer laminates was prepared from a polymerizable unsaturated polyester derived from a mixture of phthalic acid and maleic acid in a molar ratio of 4:3 and propylene glycol. To the unsaturated polyester resin there was added about 40% by weight of styrene and about 1% by weight of pyrogenic silica, these amounts being by weight of the entire resin composition. The mixture had an acid value of about 23, and a viscosity of from 1.2 to 2 poise at 5000 reciprocal seconds, measured at 25° C.

This unsaturated polyester resin composition was blended with 0.1% by weight of paraffin, to inhibit the volatilization of styrene, with 0.1% by weight of 12% cobalt naphthenate and 1.5% by weight of methyl ethyl ketone peroxide as the catalyst initiator system, and with 0.3% by weight of the hydrophobic organic compound shown in Table II below for improving adhesion of adjacent laminate layers.

In each case, a glass fiber mat weighing 450 g per square meter and normally used in the manufacture of polyester multilayer laminate was impregnated with this composition, giving a laminate layer having a glass fiber content of from about 25 to about 28% by weight. This layer was allowed to harden to a Barcol hardness of about 40.

The hardened layer was then coated with a layer 1 to 2 mm thick of the polyester resin composition without reinforcement, and this layer was allowed to cure for 48 hours at room temperature. Then, the cured layer was covered with a release film of polyester resin so that a 3 cm wide uncovered gap was formed across the surface of the laminate. Over both the gap and the unsaturated polyester layer a laminate was laid composed of three glass fiber mats having a weight of 450 g per square meter, and these layers were then impregnated with the same unsaturated polyester resin composition. The entire laminate was then allowed to harden for 24 hours at room temperature.

Using a saw, a cut was then made in the laminated molded product in parallel with the release gap down to the release film about 1 cm to the left of the gap on the top side, and another cut was made about 1 cm to the right of the gap on the bottom side. In this way, a molded laminate was obtained in which the two laminated layers were only held together by the polyester layer free from glass fibers in the gap of the release film. The laminate was then subjected to tensile strength tests in order to evaluate the adhesion to the polyester layer free from glass fibers. The results obtained are given in Table II.

TABLE II

| Example No. | Hydrophobic compound | Tensile strength kN/cm$^2$ (average value of six tests) |
|---|---|---|
| Control | None | 0.24 |
| 7 | Trimethylol propane diallyl ether | 0.37 |
| 8 | Pentaerythritol tetraacrylate | 0.42 |

Clearly, the adhesion was increased by about 50 to 75%, as compared to the Control without the hydrophobic organic compound.

EXAMPLES 9 to 13

Three glass fiber mats each 20×22.5 cm in surface area and weighing 450 g per square meter were placed on a 30×30 cm glass plate together with a glass vessel containing an amount of the polyester resin composition prepared as shown in Examples 1 to 6 in a quantity corresponding to 27.5% by weight of the glass fiber mats, and the steel roller unbended for rolling the polyester laminate, and the entire array was weighed. The polyester resin composition was then used to prepare a three-layer laminate using the three glass fiber mats on the glass plate at about 21° C. Then, after fifty minutes, the weight of the composite array was taken again, and the reduction in weight noted as a measure of the loss of styrene by volatilization. The following results were obtained:

TABLE III

| Example No. | Hydrophobic Compound | Reduction in weight g/m² |
|---|---|---|
| Control | None | 25 |
| 9 | Bodied linseed oil | 24 |
| 10 | Glycerol trioleate | 26 |
| 11 | Trimethylol propane diallyl ether | 29 |
| 12 | Pentaerythritol tetraacrylate | 33 |
| 13 | Dipentene | 26 |

It is apparent from the results that the volatilization of styrene was held at a low level.

In the absence of both the hydrophobic organic compound and the paraffin, the loss of styrene was about 150 g/m².

EXAMPLE 14

A series of multilayer laminates was prepared from a polymerizable unsaturated polyester derived from a mixture of phthalic acid and maleic acid in a molar ratio of 4:3 and propylene glycol. To the unsaturated polyester resin there was added about 40% by weight of styrene and about 1% by weight of pyrogenic silica, these amounts being by weight of the entire resin composition. The mixture had an acid value of about 23, and a viscosity of from 1.2 to 2 poise at 5000 reciprocal seconds, measured at 25° C.

This unsaturated polyester resin composition was blended with 0.1% by weight of stearyl stearate, to inhibit the volatilization of styrene, with 0.1% by weight of 12% cobalt naphthenate and 1.5% by weight of methyl ethyl ketone peroxide as the catalyst initiator system, and with 0.30% by weight of sunflower oil for improving adhesion of adjacent laminate layers.

In each case, a glass fiber mat weighing 450 g per square meter and normally used in the manufacture of polyester multilayer laminate was impregnated with this composition, giving a laminate layer having a glass fiber content of from about 25 to about 28% by weight. This layer was allowed to harden to a Barcol value of about 40. Then, a 1 to 2 mm thick layer of a polyester composition without glass fiber mat was applied to the laminate, and this second layer was also allowed to harden. A new laminate was then laid down on the fiber-free polyester layer, composed of three layers of glass fiber mat weighing 450 per square meter, and these were well impregnated with the same polyester composition to a glass fiber content of 28% by weight, after which the new layer was allowed to harden to a Barcol value of 45.

The completed four-layer laminate whose thickness was about 5 mm was then sawed into sample pieces, each 3×25 cm in surface area.

As a control, a lmainated molded product was prepared exactly as described above, but without the sunflower oil.

The relative degree of adhesion between the polyester layer without glass fiber and the layer having three resin-impregnated glass fiber mats was tested by seeking to pry the layers apart with a wood chisel, applying the chisel to the boundary layer between the layers. If the adhesion between the layer without glass fibers and the layer with glass fibers was greater than that of the layer containing glass fibers per se, the break would be not between the layers but in the surface glass fiber layer, in which event of course the break would contain glass fibers. The more glass fibers in the break, the more the break was confined to the glass fiber-containing layer and away from the interface between the layers, and the better the adhesion between the two layers, therefore.

Accordingly, the number of glass fibers in the break surface was judged visually according to a scale of three grades, in which 1 represents a break surface totally free or substantially free from glass fibers, and 3 a break surface with the greatest number of glass fibers, with the value of 2 half way between. Six samples were pried apart and the average taken. The average value for the composition containing sunflower oil was 2.8, showing very good adhesion compared to the Control, whose value was 1.0.

Having regard to the foregoing disclosure, the following is claimed as inventive and patentable embodiments thereof.

1. A polymerizable unsaturated polyester composition useful in the manufacture of multilayer laminates, consisting essentially of:
   (1) a polyester of a polyhydric alcohol and a polycarboxylic acid, at least one of which is ethylenically unsaturated;
   (2) a monomer copolymerizable with the unsaturated polyester and having a boiling point below 150° C;
   (3) an additive forming a surface film that inhibits volatilization of monomer from the polyester composition; and
   (4) a hydrophobic compound soluble at least in part both in the unsaturated polyester and in the film-forming additive that either
      (a) has an isoprene unit structure, or
      (b) is acyclic and has at least one ester and/or ether bond; and at least two terminal hydrocarbon groups each with at least one ethylenically unsaturated group.

2. A composition according to claim 1 in which the hydrophobic compound having an isoprene unit structure is a terpene.

3. A composition according to claim 2 in which the terpene is a monoterpene.

4. A composition according to claim 2 in which the terpene is selected from the group consisting of dipentene, alpha-pinene and beta-pinene.

5. A composition according to claim 1 in which the hydrophobic compound is defined by the formula $$R_2(XR_1)_m$$

wherein:
(a) each X is an oxyether —O— or carboxylic ester

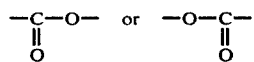

group;
(b) $R_1$ is an acyclic hydrocarbon group having from two to thirty carbon atoms, and at least two $R_1$ having at least one ethylenically unsaturated group;
(c) $R_2$ is selected from the group consisting of acyclic hydrocarbon groups having from about two to about twelve carbon atoms, and such groups including a hydroxy group; and (d) m is a number from 2 to 8.

6. A composition according to claim 5 in which the compound is an ester of aliphatic fatty acids and a polyhydric alcohol in which substantially all hydroxyl groups of the polyhydric alcohol are esterified.

7. A composition according to claim 6 in which the major part of fatty acids have at least two ethylenically unsaturated double bonds.

8. A composition according to claim 6 in which at least the major part of acids are polyunsaturated fatty acids having at least two ethylenically unsaturated double bonds with from about sixteen to about twenty-four carbon atoms and the polyhydric alcohol has three or four hydroxyl groups.

9. A composition according to claim 8 in which the ester is crude, bodied or cooked linseed oil.

10. A composition according to claim 1 in which the ethylenically unsaturated acid of the unsaturated polymerizable polyester is an alpha, beta-unsaturated dicarboxylic acid, and the polyhydric alcohol is a saturated aliphatic glycol.

11. A composition according to claim 1 in which the copolymerizable monomer is selected from the group consisting of vinyl and allyl compounds.

12. A composition according to claim 11 in which the monomer is selected from the group consisting of styrene, methyl methacrylate, acrylonitrile, vinyl chloride, allyl chloride, and vinyl acetate.

13. A composition according to claim 1 in which the film-forming compound inhibiting volatilization of the monomer from the polyester resin composition is selected from the group consisting of solid paraffin hydrocarbons, fatty acids, fatty acid esters, fatty acid salts, and plastic materials of low melting point.

14. A composition according to claim 1 in which the composition contains, for each 60 parts by weight of polymerizable unsaturated polyester, (1) an amount within the range from about 15 to about 80 parts by weight of the monomer copolymerizable with the unsaturated polyester;

(2) an amount within the range from about 0.01 to about 2 parts by weight of the additive reducing volatilization of the monomer; and (3) an amount within the range from about 0.01 to 5 parts by weight of the hydrophobic organic compound.

15. A multilayer laminate comprising a plurality of adjacent layers of a polymerizable unsaturated polyester resin composition in accordance with claim 1, polymerized in situ and having good adhesion between adjacent layers.

16. A multilayer laminate according to claim 15 comprising a reinforcing fibrous layer imbedded in at least one of the layers.

17. A multilayer laminate according to claim 16 in which the reinforcement is of glass fiber.

* * * * *